United States Patent [19]

Norton

[11] Patent Number: 4,537,329

[45] Date of Patent: Aug. 27, 1985

[54] TANK LINING SYSTEM

[75] Inventor: William W. Norton, Lincolnshire, Ill.

[73] Assignee: Culligan International Company, Northbrook, Ill.

[21] Appl. No.: 595,941

[22] Filed: Apr. 2, 1984

[51] Int. Cl.³ .............................................. B65D 25/14
[52] U.S. Cl. .................................... 220/465; 220/410; 220/470
[58] Field of Search ............... 220/465, 466, 400, 404, 220/408, 410, 470

[56] References Cited

U.S. PATENT DOCUMENTS

| | | | |
|---|---|---|---|
| 1,574,690 | 2/1926 | Radabaugh | 220/465 X |
| 2,834,503 | 5/1958 | Knapp | 220/465 |
| 2,987,216 | 6/1961 | Fletcher | 220/465 X |
| 3,119,543 | 1/1964 | Walker | 220/465 X |
| 3,458,084 | 7/1969 | Laurizio | 220/465 |

Primary Examiner—Steven M. Pollard
Attorney, Agent, or Firm—George H. Gerstman

[57] ABSTRACT

A system is provided for connecting a plastic tank lining to a penetration fitting which forms an opening through a tank wall. A collar fabricated from a conforming material is arranged to cover a portion of the penetrating fitting. The collar is affixed to the tank lining and forms a tight fit between the lining and the penetrating fitting.

6 Claims, 5 Drawing Figures

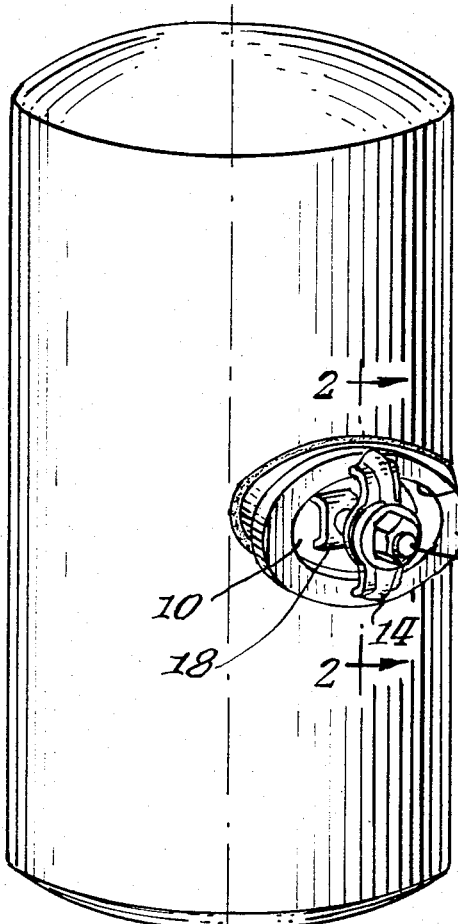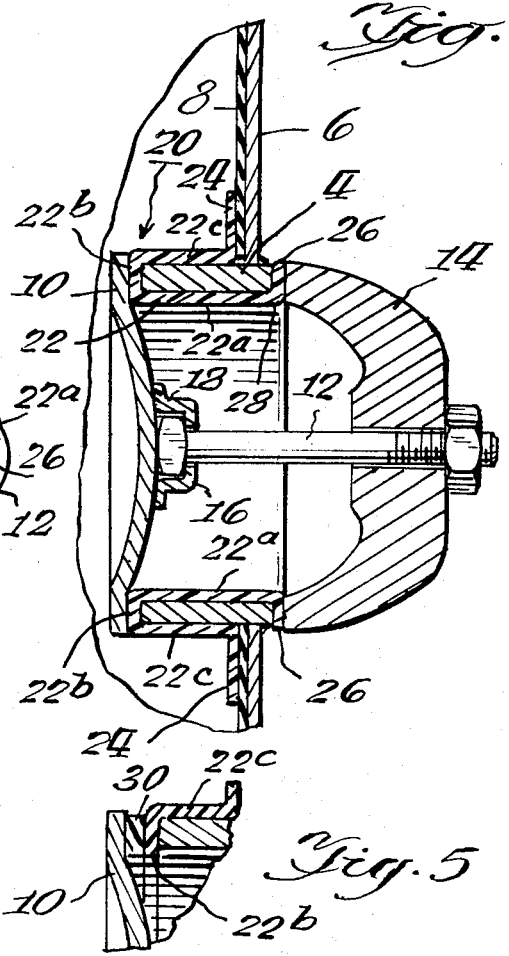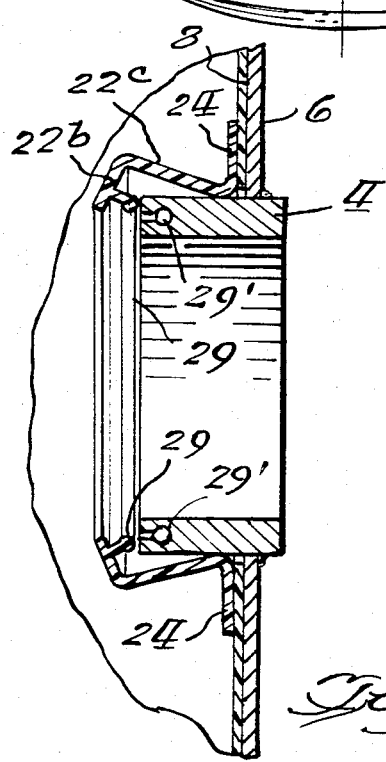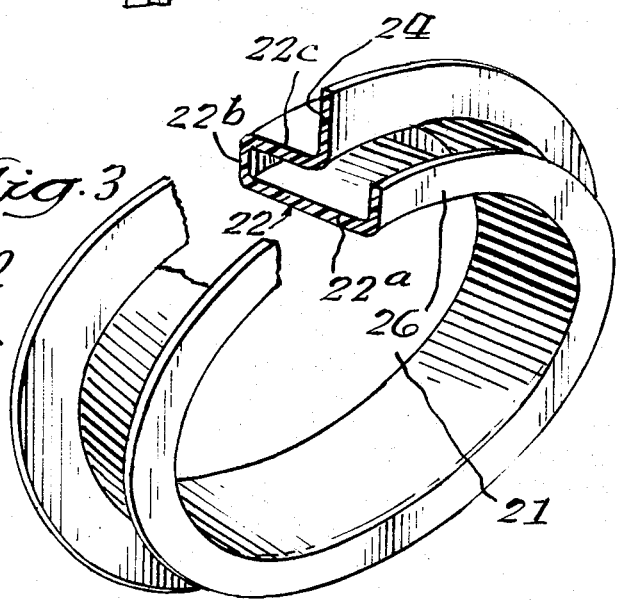

TANK LINING SYSTEM

BACKGROUND OF THE INVENTION

This invention relates in general to a novel system for connecting to tanks plastic tank linings having preformed shapes to surround flanges, fittings and other penetrations through the tank wall.

It is well-known that metal tanks, vessels and the like are subject to corrosion and other problems over extended periods of use. Tanks, such as in water conditioning, have had liners comprising (1) a painted interior; (2) rubber that has been lined in situ for a complete rubber lining; or (3) a lining formed of a sheet vinyl material. Typically, when a water conditioning tank has many flanged openings and handholds, either the painted interior or the rubberized interior is used. The vinyl liner has been used only with vessels having a simple outlet. Normally, vinyl lining is fabricated from sheet material which is cut and formed to conform with the interior of the vessel. The seams are then sealed through any known technique, such as a radio frequency heat sealing technique, as disclosed in U.S. Pat. No. 3,159,306, or a solvent, or impulse sealing. The vinyl adheres by virtue of the near vacuum created between the liner and the vessel wall.

The irregularity of an opening, such as a manhole, is not suitably accommodated by sheet material liners without excessive wrinkling. In service, wrinkles in the tank liner are subject to damage and tearing where pressure is applied. Accordingly, the advantageous presence of a vinyl liner has not been feasible where the tank possesses numerous penetrations, as are commonly present.

SUMMARY OF THE INVENTION

It is therefore an object of this invention to permit the use of protective linings in tanks and vessels equipped with one or more openings or penetrations.

Another object of this invention is to attach highly conforming shapes to cover the flanges or other structural portions of openings through their side wall.

A further object of this invention is to provide a highly conformable fit between a conformable member and the geometrical shape of the opening through a tank or vessel wall.

Still another object of this invention is to provide an improved attachment of a conforming shape to a flange or other portion of a penetration through a vessel or container.

These and other objects are attained in accordance with the present invention wherein there is provided a plastic tank lining having one or more preformed fittings shaped to accommodate flanged openings, manholes and the like. The preformed shape is fabricated from a vinyl or similar material, such as Plastisol and the like, capable of being fitted in tight conformance over the penetrating structure through a vessel wall and forming a smooth continuity with the vinyl lining without puckering, wrinkling, or such non-smooth contact with the tank.

BRIEF DESCRIPTION OF THE DRAWINGS

Further objects of the invention, together with additional features contributing thereto and advantages accruing therefrom, will be apparent from the following description of preferred embodiments of the invention, which is shown in the accompanying drawings with like reference numerals indicating corresponding parts throughout wherein:

FIG. 1 is a perspective view of a vessel having an interior lined with vinyl and having a conformable collar of the invention;

FIG. 2 is a partial schematic view, with parts in section, of the collar of the invention;

FIG. 3 is a perspective view, with parts broken away and parts in section, of the collar of the invention;

FIG. 4 is a partial sectional view of another embodiment of the invention having a mechanical connection of the collar to a flange of a vessel; and FIG. 5 is a partial schematic view, with parts in section, of the collar of FIG. 2 having sealing means.

DESCRIPTION OF THE PREFERRED EMBODIMENTS

Referring now to FIG. 1, there is illustrated a typical pressure vessel or tank, generally designated by reference numeral 2, and having one or more penetrations to form manhole openings and the like through the exterior tank wall 6. The penetration 4 comprises a sleeve member or cylinder which can constitute any regular or irregular shape, having a novel, cylindrical or other cross-section. The interior wall of the tank 2 is lined with a vinyl plastic liner for protection against corrosion and other problems in the storage of various liquids. As is well-known, the liner seam may be sealed using radio frequency heat sealing techniques, various solvents or other adhesive techniques, or impulse sealing. The liner adheres to the vessel wall by virtue of a near vacuum pressure existing between the sheet material and the internal vessel surface. Although the lining 8 is described as being a vinyl material, it is within the scope of the invention to use other suitable liners in conjunction with the invention.

Referring to FIGS. 1 and 2, the opening of penetration 4 through the side wall of cylinder 2 may be equipped with a conventional cover 10 which is retained within the tank by means of a bolt assembly 12. The bolt assembly 12 has a threaded end to cooperate with a spider 14. The interior end of the bolt assembly includes an enlarged end 16, which is retained by a captive bracket member 18 for retention of the cover 10.

As seen in FIG. 2, the cylinder 4 forming the penetration is generally surrounded by a preformed, highly conformable collar creating an effective extension of the liner 8 over the penetration. As seen in FIG. 3, the collar 20 is a unitary, integral member forming a central opening 21. The collar 20 is formed as a member highly conformable from any vinyl or similar material such as Plastisol, in a circular, oval or other similar cross-sectional configuration closely approximating the shape of the vessel fitting. The collar 20 may be formed by such known processes as dip molding, slip molding, injection molding, transfer molding and the like. In certain molding situations, the collar 20 is molded with a continuous cross-section and portion 21' is trimmed circumferentially around the collar.

The design of the collar 20 is arranged to conform as a tight overlay to any irregular shape of the structure forming an opening through the tank. As further shown in FIG. 3, the boby 20 possesses a hollow interior defined by a U-shaped portion 22 formed by annular wall 22a and wall 22b and upper wall 22c. In its trimmed condition, as will be apparent, the outer edge of the collar 24 projects outward from wall 22c to form a flange 24, which is affixed to vinyl lining 8. The outer end of the collar projects from the wall 22a to form an outward flange 26 in the trimmed configuration of the collar.

In FIG. 2, the collar 20 is mounted in surrounding relationship to the cylindrical penetration 4. The U-shaped portion of the collar is arranged so that wall 22a covers the annular interior wall of the penetration 4, while walls 22b and 22c, respectively, are laid over the interior end of the penetration and its exterior surface within the vessel 2. The flange 24 is affixed to the liner 8 using a radio frequency heat sealing technique or solvent, and becomes an integral part of the liner. The outer flange 26 is retained in close conformance to the outer surface of the penetration cylinder 4. The end surface 28 of spider 14 bears against a portion of the flange 26 in retention of the cover 10.

As shown in FIG. 4, the collar may alternatively only partially cover the penetration structure 4. In addition, in FIG. 4 a continuous or split male projection 29 may be provided on wall 20b of the collar 20 and may be inserted into coresponding groove 29' formed in the penetration, such as on the internal end wall of the flange structure. Such mechanical adherence of the collar 20 is particularly advantageous in anchoring the vinyl liner during application to the wall. In FIG. 5, a gasket 30 of plastic, such as elastomeric, material is positioned between wall 22b and the cover member 10 as an optional feature to prevent undesirable cold flow of the vinyl, because of the pressure within the vessel 2, and also the force applied by cover 10. It is found that the presence of a gasket 30 aids in preventing such cold forming problems and increases the thickness of material between the cover and flange.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A tank lining system which comprises:
   a tank having a wall defining an opening;
   a sheet lining adhering to the interior surface of said wall and defining an opening that is aligned with the opening defined by the tank wall;
   a penetration fitting having a periphery that is similar in configuration to said opening and extending into the interior of the tank through said opening, said fitting having an outer surface, an end surface, and an inner surface;
   a collar having a flange surrounding the periphery of said opening, a first wall surrounding said penetration fitting outer surface and extending towards the tank interior and generally perpendicular to said flange, and a second wall overlying said end surface and extending generally perpendicular to said first wall towards the center of said opening, said collar having a generally Z-shaped cross-sectional configuration;
   means connecting said collar flange to the plastic sheet adjacent its opening; and
   said first wall and said second wall of the collar being located in tight conformance with the outer surface and end surface respectively, of the penetration fitting, whereby a tight fit is provided between the plastic lining and the penetration fitting.

2. A tank lining system as described in claim 1, said collar also including a third wall in tight conformance with said inner surface of the penetration fitting.

3. A tank lining system as described in claim 1, said penetration fitting end surface and said collar second wall having connecting means for providing a positive connection.

4. A tank lining system as described in claim 3, said connecting means comprising a projection and complementary groove arrangement.

5. A tank lining system as described in claim 1, including a cover member within the tank and closing the opening defined by the tank wall, the cover member overlying said end surface of the penetration fitting and said second wall of the collar.

6. A tank lining system as described in claim 5, including an elastomeric gasket interposed between said cover member and said second wall.

* * * * *